UNITED STATES PATENT OFFICE.

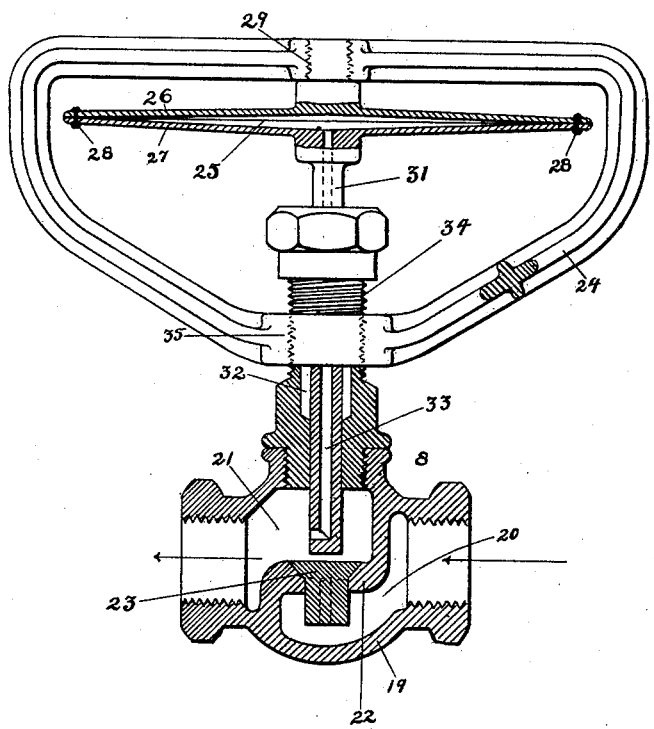

NATHANIEL LOMBARD AND JOSEPH O. BANNING, OF BOSTON, MASSACHUSETTS, ASSIGNORS TO THE BOSTON CHEMICAL FIRE ENGINE MANUFACTURING COMPANY.

PRESSURE-REDUCING DEVICE.

SPECIFICATION forming part of Letters Patent No. 700,954, dated May 27, 1902.

Application filed April 21, 1900. Serial No. 13,788. (No model.)

*To all whom it may concern:*

Be it known that we, NATHANIEL LOMBARD and JOSEPH O. BANNING, of Boston, in the county of Suffolk and State of Massachusetts, have invented certain new and useful Improvements in Pressure-Reducing Devices, of which the following is a specification.

This invention relates to mechanism for automatically reducing the pressure of a fluid passing through a conduit, and has for its object to provide novel and simple and reliable means particularly useful for reducing the pressure of compressed air employed for impelling a fire-extinguishing fluid, although we do not restrict ourselves to such use of the said mechanism.

Our invention consists in certain novel features of construction and arrangement, which we will now proceed to describe and claim.

In the accompanying drawing the figure represents a sectional view of the principal parts of the device, other portions being represented in side elevation.

In carrying out our invention we provide a novel and simple form of reducing-valve for reducing the pressure of a fluid, such as compressed air passing through the chambers of the valve in the direction indicated by the arrows. Said valve has a casing 19, with inlet and outlet chambers 20 21, separated by a partition 22, which has a seat for a valve 23. We prefer to make the valve 23 separate from its actuating-stem, so as to permit it to act as a check-valve, which will close if for any reason the pressure in chamber 21 exceeds the pressure in chamber 20.

Attached to the casing 19 is a rigid yoke or frame 24, which forms an outer abutment for an expansible chamber 25, consisting of two plates 26 27, having a tight joint at their edges secured by rivets 28 or other suitable devices. The plate 26 is shown as attached by a screw-stem 29 to the frame or yoke 24, while the plate 27 is connected to a stem 31, which extends through a stuffing box or gland 32 into the interior of the casing 19 and has its end located within the outlet-chamber 21 in proximity to the valve 23. The pressure of the outlet-chamber 21 is brought to the interior of the expansible chamber 25 by means of a duct 33, traversing the stem 31. The spring of the plates 26 27 is such as to normally retract stem 31 from the valve 23; but when the outlet-chamber or terminal pressure becomes sufficient to overcome the force of the spring action said stem 31 will be forced inwardly and will cause the valve 23 to close against its seat. To adjust or vary the closing-pressure of the valve, we make the frame or yoke 24 adjustable, this being done, as shown in the drawings, by threading a stem 34 on a part of the valve-casing 19 and correspondingly threading the lower part or collar 35 of the yoke 24. By turning the yoke the expansible chamber 25 and stem 31 will thereby be moved bodily inwardly or outwardly.

We claim—

1. A pressure-reducing device comprising a casing having inlet and outlet chambers connected by a passage, a valve controlling said passage, an expansion-chamber external to the casing, a stem interposed between said chamber and the valve, and passing through the wall of the casing, a duct traversing said stem and connecting the interior of the expansion-chamber with the outlet-chamber, whereby the pressure in the expansion-chamber is controlled by that in the outlet-chamber, and means to bodily adjust said expansion-chamber axially of said stem.

2. A pressure-reducing device comprising a casing having a valve-seat located between inlet and outlet chambers, a valve operating in connection with said seat, a stem for operating said valve, said stem being separate from the valve, an expansion-chamber with separable walls controlling said stem and adapted to close the valve by the separation of said walls, a yoke or frame connected with the casing and forming an outer abutment for said chamber being detachably secured to said chamber, and means to bring the pressure of the outlet-chamber to the interior of said expansion-chamber.

3. A pressure-reducing device comprising a casing having a valve-seat located between inlet and outlet chambers, a valve operating in connection with said seat, a stem for operating said valve, said stem being separate from the valve, an expansion-chamber consisting of two plates connected at their edges and one of said plates connected to the stem, the said plates having a springiness normally moving them together, the separation of said plates causing the valve to close, a yoke connected with the casing and attached to the outer plate, and means to bring the pressure of the outlet-chamber to the interior of said expansion-chamber.

4. A pressure-reducing device comprising a casing having a valve-seat located between inlet and outlet chambers, a valve operating in connection with said seat, a stem for operating said valve, said stem being separate from the valve, an expansion-chamber consisting of two plates connected at their edges and one of said plates connected to the stem, the said plates having a springiness normally moving them together, a yoke connected with the casing and attached to the outer plate, and a duct traversing said stem and connecting the outlet-chamber with the expansion-chamber, whereby the pressure in the expansion-chamber is controlled by that in the outlet-chamber.

5. A pressure-reducing device comprising a casing having a valve-seat located between inlet and outlet chambers, a valve operating in connection with said seat, a stem for operating said valve, an expansion-chamber with separable walls controlling said stem, a yoke or frame connected with the casing and forming an outer abutment for said chamber, means to bring the pressure of the outlet-chamber to the interior of said expansion-chamber, and means to adjust said yoke on the casing.

In testimony whereof we have affixed our signatures in presence of two witnesses.

NATHANIEL LOMBARD.
JOSEPH O. BANNING.

Witnesses:
R. M. PIERSON,
M. B. MAY.